United States Patent [19]

Bachand et al.

[11] 3,868,142
[45] Feb. 25, 1975

[54] ADJUSTABLE TRUCK COVER

[75] Inventors: Ernest C. Bachand, Millbury;
Frederick G. J. Grise, Wilbraham, both of Mass.

[73] Assignee: Pioneer Coveralls Inc., North Oxford, Mass.

[22] Filed: May 31, 1973

[21] Appl. No.: 365,469

[52] U.S. Cl.................................. 296/98, 296/100
[51] Int. Cl............................................ B60j 11/00
[58] Field of Search...................... 296/100, 101, 98

[56] References Cited
UNITED STATES PATENTS

| | | | |
|---|---|---|---|
| 3,416,834 | 12/1968 | Morse, Jr. | 296/100 |
| 3,447,830 | 6/1969 | Willison | 296/100 X |
| 3,549,197 | 12/1970 | Sibley | 296/100 |
| 3,549,199 | 12/1970 | Sibley | 296/100 |

FOREIGN PATENTS OR APPLICATIONS

| | | | |
|---|---|---|---|
| 354,241 | 6/1961 | Switzerland | 296/100 |

Primary Examiner—Richard A. Schacher
Assistant Examiner—James M. Slattery
Attorney, Agent, or Firm—Charles R. Fay

[57] ABSTRACT

An adjustable support for a truck cover comprising adjustable upright standards, a shaft thereon, a cover secured to the shaft, and means to extend the cover from the adjustable standards to a position at the back of the truck, said means being adjustable lengthwise of the truck.

7 Claims, 3 Drawing Figures

PATENTED FEB 25 1975 3,868,142

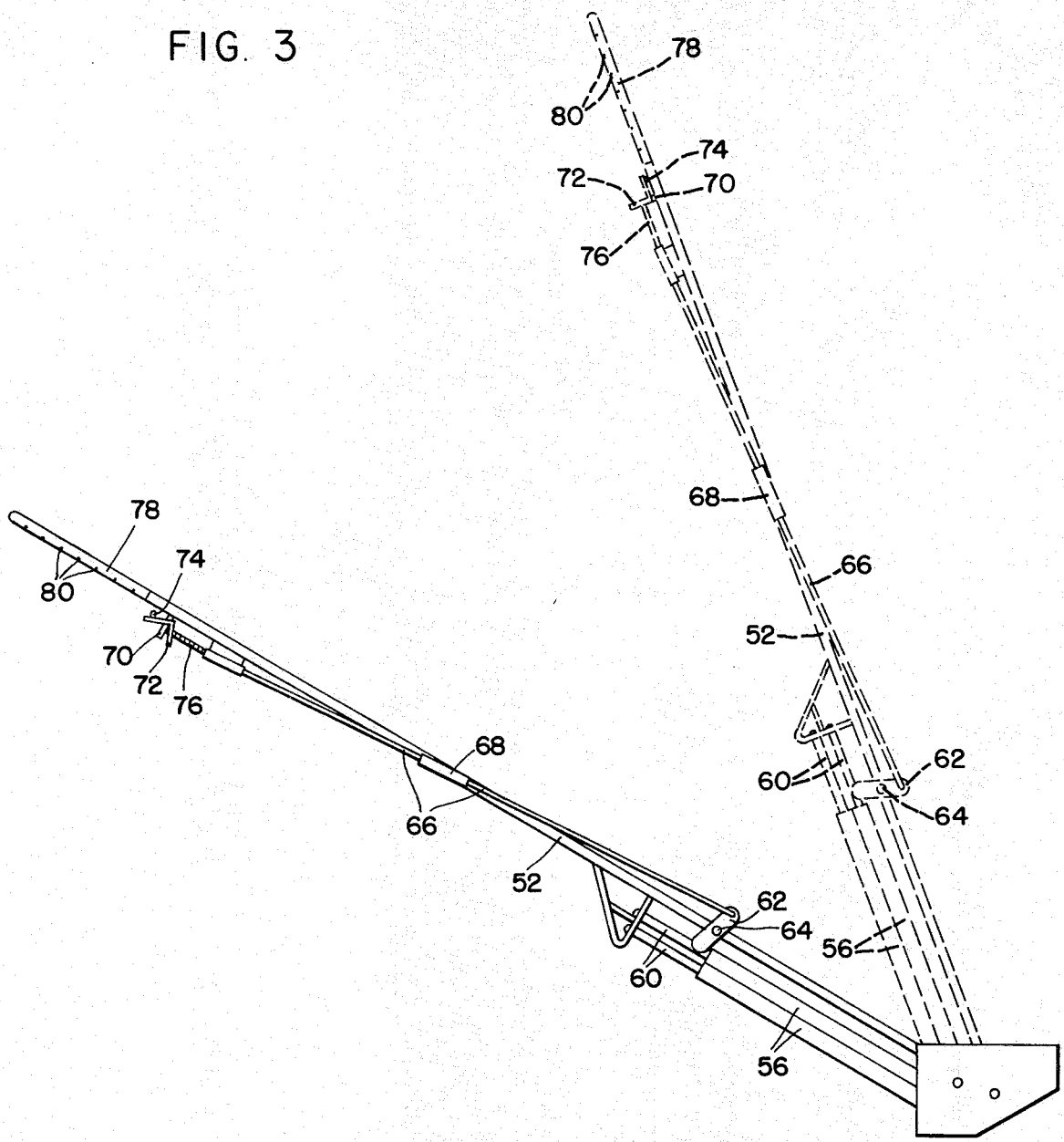

ADJUSTABLE TRUCK COVER

BACKGROUND OF THE INVENTION

In order to prevent littering the streets an open top truck containing loose material must have a cover and in cases where large open trash containers are being transported covers must be provided for these trash containers.

However the trash containers vary greatly in size both as to height and length and especially when the containers are 8 feet high or more it is very difficult for a cover to be applied thereto, and if a cover should be attached to each trash container, it is difficult to manipulate the same to cover the container.

It is the principal object of the present invention to provide an adjustable truck cover which will cover in a single unit all of the truck bed and any container thereon regardless of size, longitudinally

SUMMARY OF THE INVENTION

A pair of standards are applied to a truck frame adjacent the headboard of the truck. These standards contain telescopic members which are movable in a vertical direction together by means of a motor, said telescopic members supporting a roll shaft or other roll support for the cover which is rolled thereon. There is longitudinally adjustable means at each side of the truck for drawing the cover from the roll, regardless of its adjusted elevation, to the rear of the truck, and including means for power manipulation of the last named adjustable means between a position substantially intermediate of the truck body to a position closer to the rear end of the truck, whereby said cover is adjustable vertically adjacent the headborad, being used to cover a relatively short load or a relatively long load depending upon the longitudinal adjustment of the means for extending or withdrawing the cover from its adjustable roll. Also, means is provided to automatically extend the cover during its motion to covering position.

BRIEF DESCRIPTION OF THE DRAWINGS

FIG. 3 is a view in side elevation of a means to extend the cover during its motion to covering condition.

PREFERRED EMBODIMENT OF THE INVENTION

Figure 1:
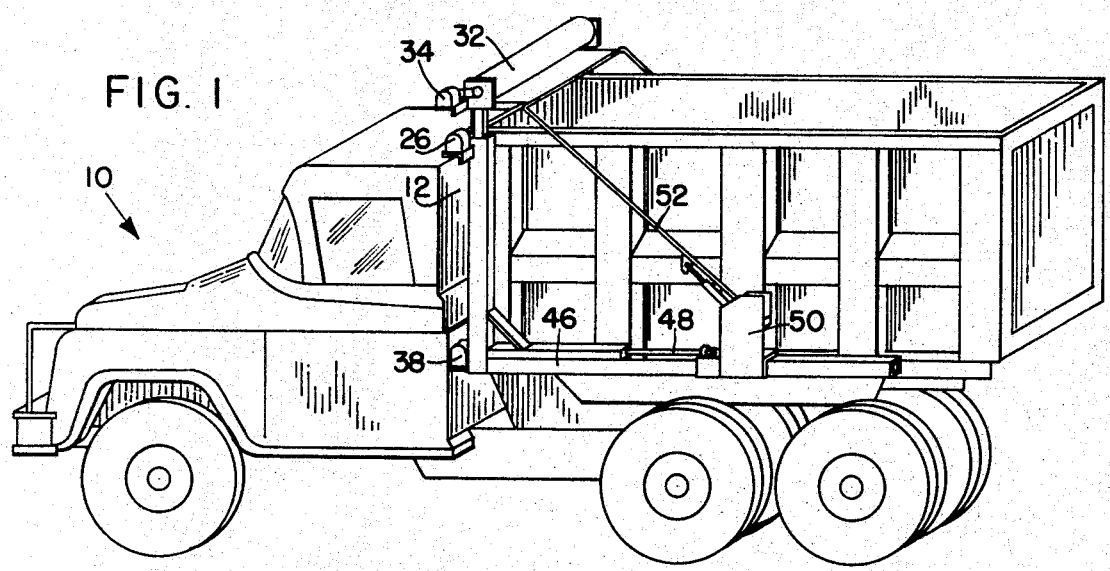
FIG. 1 is a perspective view illustrating a truck cab and frame with the invention applied thereto.
Figure 2:
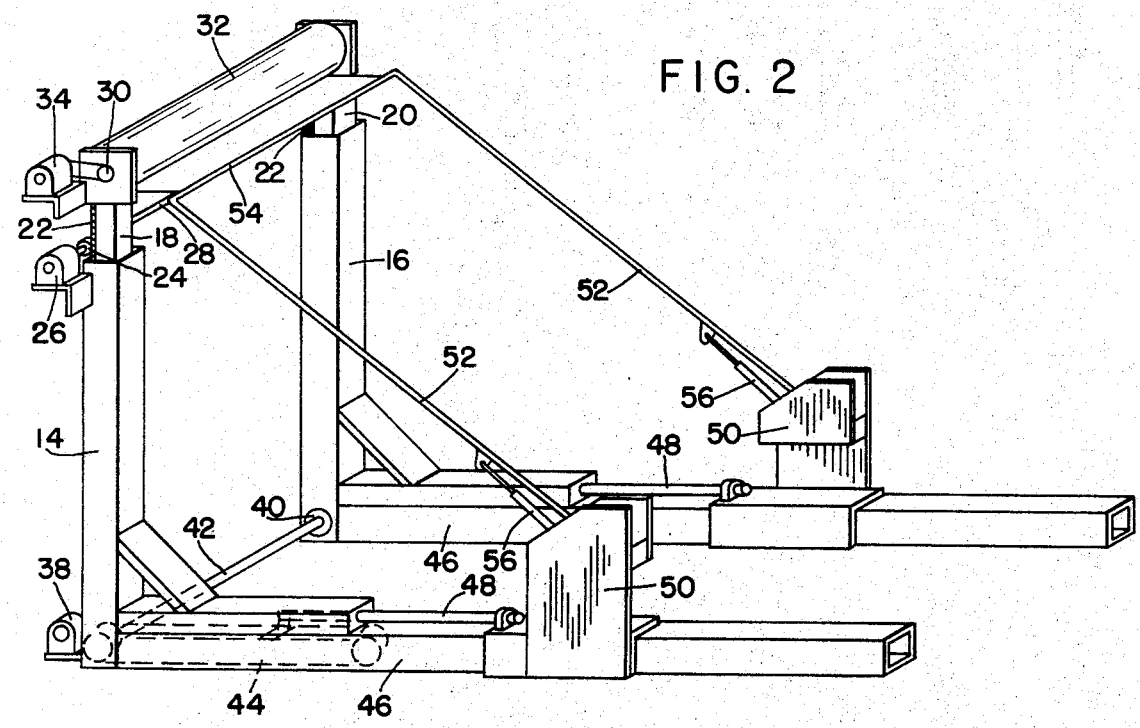
FIG. 2 is a perspective view illustrating the adjustment of the cover.

In FIG. 1 the reference numeral 10 indicates the cab of a truck which has a headboard 12 mounted on the frame of the truck. At each side thereof adjacent the headboard are a pair of standards 14 and 16. Telescopically received within said standards are telescopic members 18 and 20 each of which is provided with a ratchet 22, 22, engaged by and operated by gears 24, 24 driven by a motor 26 mounted on standard 14 at the upper end thereof. The two gears 24, 24 are connected by a shaft 28 for simultaneous operation in order to raise and lower telescopic members 18 and 20.

At the upper end of the telescopic members 18 and 20 there is mounted a shaft 30 upon which is mounted a roll of canvas or other suitable covering material 32, and shaft 30 is driven in either direction by a motor 34 appropriately connected with respect to shaft 30.

At the lower ends of standards 14 and 16 there is located another motor 38 which drives sprockets 40, sprockets 40 being connected by shaft 42 for simultaneous operation thereof, one at each side of the truck frame. Sprockets 42 drive respective chains 44, 44 contained in fore and aft tubular members or rails 46, 46 mounted on the truck frame. Each chain 44, 44 is connected to a rod 48 to slide a bracket 50, 50 along its rail, in either direction.

All the motors are easily controllable from a single area, e.g., in the cab, or on a side of the truck, or on a standard 14 or 16.

The brackets 50 swingingly mount arms 52, 52 which are connected by a cross piece 54 to which an end of the cover is connected. Each arm has means to swing it, as at 56, 56, as disclosed in U.S. Pat. No. 3,549,198, or 3,549,199, or by other means.

The operator can position the cover roll on shaft 30 according to the height of the load and the brackets and hence arms 52, 52, according to the length of the load. Then by causing the arms 52 to swing to the rear, or by using whatever cover extending mechanism is used, the variable load is adequately covered to a close degree to prevent escape of detritus, etc., from any ordinary size of open top container on the truck.

FIG. 1 illustrates a box or container 58 having an open top which must be covered, and it will be seen that by swinging arms 52 to the rear, the entire box can be covered according to law. For a shorter box the brackets are retracted, and for a lower sided box, the roll 32 can be lowered, all from a convenient spot where the electric motor controls are located. Thus the cover is custom adjustable to a wide range of sizes.

Referring now to FIG. 3, it will be seen that the bow side arm 52 is projected to some extent e.g., by means of a spring in the cylinder 56, as the bow is moved from its more or less fully retracted position shown in solid lines to the dotted line position, toward the rear of the truck as illustrated by the elements 60.

The link 62 pivoted at 64 on arm 52 is engaged with an elongated rod 66 guided in a tube 68 terminating in a connection 70 with respect to a pivoted bracket 72 having a locking pin 74 thereon and a retraction spring 76.

Slidably mounted in arm 52 the bow portion of the device is indicated as at 78 and it is provided with a series of holes 80.

When the arm 52 is in the solid line position, FIG. 3, i.e., retracted and down, the link 62 is engaged by the end of the cylinder 56 in such a way as to retract rod 66 thereby retracting bracket 72 against the action of spring 76 and releasing locking pin 74 from an appropriate hole 80 in the bow 78, so that in this condition the bow 78 is movable longitudinally i.e., telescopically with reference to the arm 52.

However, in extracting the cover out of its roll 32, the member 60 is moved relatively upwardly as well as clockwisely, FIG. 3, the link 62 is released and spring 76 moves the locking pin 74 to a locking position, thereby latching the bow 78 in extended condition with respect to the arm 52; this provides an adjustment of the cover to extend it more to the rear of the truck, and less to the front of the truck upon the reverse or retraction motion.

We claim:

1. The combination of a truck having a frame with an extensible flexible cover for the truck contends and means to adjust the position of the cover,
    wherein said means comprises a standard, means to generally vertically adjust the standard,
    a rail, a bracket being slidable thereon, and means to slide the bracket along the rail generally longitudinally of the frame,
    means to support the cover on the standard and the frame,
    the means to support the cover on the bracket comprising a member movable generally fore and aft with respect to the bracket,
    said member being elongated, and including means on the bracket to swingingly mount the member at one end, said member having an end portion of the cover connected thereto at the opposite end, extending the cover as the member moves aft, and means to retract and roll up the cover.

2. The combination of claim 1 wherein the means to slide the bracket comprises a flexible endless member arranged along the rail.

3. The combination of a truck having a frame, with means to adjustably mount an extensible flexible cover thereon, said means comprising:
    a pair of spaced upright standards, one at each side of the frame adjacent the cab,
    a rod between said standards said cover being connected at one end to said rod,
    a pair of spaced rails, one at each side of the frame, said rails extending generally along the sides of the frame, a bracket on each rail, each said bracket being slidable along its rail, a cover extending arm on each bracket, said arms being swingable on their brackets fore and aft of the frame,
    means on the rails to slide the brackets fore and aft, and
    means on the arms connected to the cover at its opposite end.

4. The combination of claim 3 including means to extend the standards, and means to rotate the rod to roll up the cover thereon.

5. The combination of claim 3 including means to swing the arms in a direction away from the standards, the arms swinging toward the standards under influence of the means to rotate the rod.

6. The combination of claim 3 including a bow portion on said arms, said bow portion having ends telescopically engaged with respect to said arms, means for adjustably positioning the bow portion with relation to said arms, and means for locking the adjusted bow in position with respect to the arms.

7. The combination of claim 6 including means locking and unlocking the bow portion with respect to the arms during the motion of the swinging motion of the arms on the brackets.

* * * * *